United States Patent [19]

Innertsberger et al.

[11] Patent Number: 4,919,843
[45] Date of Patent: Apr. 24, 1990

[54] ANTIFOAM COMPOSITIONS

[75] Inventors: Ernst Innertsberger, Burghausen; Jakob Schmidlkofer, Mehring-Öd; Peter Huber, Burghausen; Willibald Burger, Burghausen; Joachim Schulze, Burghausen, all of Fed. Rep. of Germany

[73] Assignee: Wacker-Chemie GmbH, Munich, Fed. Rep. of Germany

[21] Appl. No.: 222,866

[22] Filed: Jul. 22, 1988

[30] Foreign Application Priority Data

Jul. 30, 1987 [DE]  Fed. Rep. of Germany ....... 3725322

[51] Int. Cl.$^5$ .............................................. C09K 13/00
[52] U.S. Cl. ................... 252/358; 252/321; 524/860; 528/33
[58] Field of Search ............... 252/358, 321; 524/860; 528/33

[56] References Cited

U.S. PATENT DOCUMENTS

| | | | |
|---|---|---|---|
| 2,416,504 | 2/1947 | Trautman | 252/358 |
| 3,455,839 | 7/1969 | Rauner | 252/358 |
| 4,338,217 | 7/1982 | Pirson et al. | 252/358 |
| 4,395,352 | 7/1983 | Kulkarni et al. | 252/358 |
| 4,436,647 | 3/1984 | Pirson et al. | 252/321 |
| 4,584,125 | 4/1986 | Griswold et al. | 252/358 |
| 4,597,894 | 7/1986 | Abe et al. | 252/358 |
| 4,749,740 | 6/1988 | Aizawa et al. | 252/358 |
| 4,762,640 | 8/1988 | Schiefer | 252/358 |

Primary Examiner—Richard A. Schwartz
Assistant Examiner—Catherine S. Scalzo

[57] ABSTRACT

The invention relates to antifoam compositions containing an essentially linear organopolysiloxane, a silicone resin containing essentially triorganosiloxy and $SiO_{4/2}$ units, and a filler.

7 Claims, No Drawings

ANTIFOAM COMPOSITIONS

The invention relates to antifoam compositions and more particularly to antifoam compositions which are particularly suitable for use in detergents. These antifoam compositions contain an essentially linear organopolysiloxane, a silicone resin consisting essentially of triorganosiloxy and $SiO_{4/2}$ units, and filler(s).

BACKGROUND OF THE INVENTION

Foam-reducing mixtures containing a polydimethylsiloxane fluid, a resin consisting of trimethylsiloxy and $SiO_{4/2}$ units, and $SiO_2$ aerogel are described in U.S. Pat. No. 3,455,839 to Rauner. Antifoam agents based on an organopolysiloxane, filler and dispersing agent which contain substantial amounts of 2,2,4-trimethyl-1,3-diisobutyryloxypentane are described in U.S. Pat. No. 4,477,371 to Huber et al.

Therefore, it is an object of the present invention to provide new antifoam compositions. Another object of the present invention is to provide antifoam compositions for detergents, whose effect decreases only very slightly during the washing cycle. A further object of the present invention is to provide antifoam compositions which may be added to a detergent slurry and then spray-dried.

SUMMARY OF THE INVENTION

The foregoing objects and others which will become apparent from the following description are accomplished in accordance with this invention, generally speaking, by providing antifoam compositions containing an essentially linear organopolysiloxane, a silicone resin consisting essentially of triorganosiloxy and $SiO_{4/2}$ units, and filler(s), wherein at least part of the essentially linear organopolysiloxane contains, in addition to the SiC-bonded organic radicals, SiOC-bonded radicals containing carbon and hydrogen atoms and/or carbon, hydrogen and at least 2 oxygen atoms per radical, and if appropriate, also at least one Si atom and having in each case at least 6 carbon atoms per radical, in which the antifoam composition does not contain more than 10 percent by weight of 2,2,4-trimethyl-1,3-diisobutyryloxypentane, based on the weight of the essentially linear organopolysiloxane, silicone resin and filler.

DESCRIPTION OF THE INVENTION

The essentially linear organopolysiloxane present in antifoam compositions of this invention preferably contain units of the formulas $R_2SiO$, $R(R'O)SiO$, $R_3SiO_{\frac{1}{2}}$, $R_2(R'O)SiO_{\frac{1}{2}}$, $RSiO_{3/2}$, $R'OSiO_{3/2}$ and $SiO_{4/2}$ units, with the proviso that not more than 20 percent of the siloxane units are units of formulas $RSiO_{3/2}$, $R'OSiO_{3/2}$ and $SiO_{4/2}$.

The silicone resin present in the antifoam compositions of this invention preferably contain units of the formulas $R_3SiO_{\frac{1}{2}}$, $R_2(R'O)SiO_{\frac{1}{2}}$) and $SiO_{4/2}$ in which each of the units are present in an amount no greater than 5 percent of the siloxane units of the formulas $R_2SiO$, $R_2(RO)SiO_{\frac{1}{2}}$ and $R_2(HO)SiO_{\frac{1}{2}}$. In all of the above formulas, R represents the same or different monovalent hydrocarbon radicals, or substituted monovalent hydrocarbon radicals, which preferably contain from 1 to 18 carbon atoms per radical, and R' represents the SiOC-bonded radicals containing carbon and hydrogen atoms or carbon, hydrogen and at least 2 oxygen atoms per radical and, if appropriate, also at least one Si atom and having in each case at least 6 carbon atoms per radical.

Examples of hydrocarbon radicals represented by R are alkyl radicals, such as the methyl, ethyl, n-propyl, isopropyl, n-butyl, sec-butyl and octadecyl radicals; alkenyl radicals, such as the vinyl radical, cycloalkyl radicals, such as the cyclohexyl radical and methylcyclohexyl radicals; aryl radicals, such as the phenyl radical, aralkyl radicals, such as the 2-phenylpropyl radical, and alkaryl radicals, such as the tolyl radicals.

Examples of substituted hydrocarbon radicals represented by R are, in particular, halogenated hydrocarbon radicals, such as the 3,3,3-trifluoropropyl radical and o-, p- and m-chlorophenyl radicals.

Because of their availability, it is preferred that at least 80 percent of the number of SiC-bonded radicals in the organopolysiloxanes of the antifoam compositions of this invention be methyl radicals.

The SiOC-bonded radicals represented by R', which contain carbon, hydrogen and at least 2 oxygen atoms per radical and, if appropriate, also at least one Si atom, and in each case at least 6 carbon atoms per radical, are preferably monovalent radicals. However, they can also be divalent radicals.

The SiOC-bonded radicals containing carbon and hydrogen atoms and having at least 6 carbon atoms per radical preferably do not contain more than about 30 carbon atoms per radical. These radicals are also preferably alkyl radicals, such as the n-hexyl, 2-ethylhexyl, lauryl, isotridecyl and 2-octyldodecyl radical, or cycloalkyl radicals, such as methylcyclohexyl radicals. However, these radicals can also be, for example, radicals containing carbon and hydrogen atoms and an aliphatic multiple bond, such as the oleyl radical, aryl radicals, such as the phenyl radical, aralkyl radicals, such as the benzyl radical; or alkaryl radicals, such as the tolyl radicals.

In the SiOC-bonded radicals containing carbon, hydrogen and at least 2 oxygen atoms per radical and, if appropriate, also at least one Si atom and at least 6 carbon atoms per radical, at least two of the oxygen atoms are preferably ether oxygen atoms. These radicals, furthermore, preferably have a molecular weight of from 100 to 20,000.

Examples of SiOC-bonded radicals containing carbon, hydrogen and at least 2 oxygen atoms per radical and, if appropriate, also at least one Si atom and at least 6 carbon atoms per radical are polyethylene glycols and polypropylene oxide units, in which these units may be in blocks or randomly distributed. If these radicals are not divalent, which in any case is not preferred, the oxygen atom on the end opposite the oxygen atom linked to the Si atom is preferably bonded to an alkyl radical, such as the methyl or n- or tert-butyl radical. However, it can also be bonded, for example, to an acyl radical, such as the acetyl radical, or for example, to a trimethylsilyl radical.

The essentially linear organopolysiloxanes which contain, in addition to the SiC-bonded organic radicals, the same or different SiOC-bonded radicals represented by R', which contain carbon and hydrogen atoms and/or carbon, hydrogen and at least 2 oxygen atoms per radical and if appropriate also at least one Si atom and in each case having at least 6 carbon atoms per radical can be prepared in a manner known heretofore, such as, for example, by condensation of organopolysiloxanes containing Si-bonded hydroxyl groups with alcohols of the general formula

R'OH where R' is the same as above, in the presence of acid or alkaline catalysts, such as acid-treated bentonite or methanolic potassium hydroxide.

One type of essentially linear organopolysiloxane containing SiOC-bonded organic radicals of the type defined above, can be used in the preparation of the antifoam compositions of this invention. However, at least two different types of organopolysiloxanes having the SiOC-bonded radicals can be used in the preparation of the antifoam compositions.

The units in the essentially linear organopolysiloxanes containing SiOC-bonded radicals of the type described above are preferably used in an amount of at least 90 percent of those of the formula $R_2SiO$ and $R_2(R'O)SiO_{\frac{1}{2}}$, where R and R' are the same as above. It is also preferred that each organopolysiloxane have an average viscosity of from 50 to 500,000 $mm^2 \cdot s^{-1}$, and more preferably from 350 to 60,000 $mm^2 \cdot s^{-1}$, measured at 25° C. The amount of essentially linear organopolysiloxane containing, in addition to the SiC-bonded organic radicals, SiOC-bonded radicals having carbon and hydrogen atoms and/or carbon, hydrogen and at least 2 oxygen atoms per radical and, if appropriate, also at least one Si atom and in each case at least 6 carbon atoms per radical is preferably from 2 to 95 percent by weight, based on the total weight of all the essentially linear organopolysiloxanes, the silicone resin and fillers present in the antifoam composition.

The silicone resin containing essentially triorganosiloxy and $SiO_{4/2}$ units preferably consists of at least 90 percent of the units of the formulas $R_3SiO_{\frac{1}{2}}$ and $SiO_{4/2}$, where R is the same as above. Because of their availability, at least 80 percent of the radicals represented by R are preferably methyl groups. The silicone resins can, for example, be resins which are solid at room temperature and consist of $(CH_3)_3SiO_{\frac{1}{2}}$ and $SiO_{4/2}$ units, in which from 0.25 to 1.25 $(CH_3)_3SiO_{\frac{1}{2}}$ units are present per $SiO_{4/2}$ unit. Because of their preparation, the preferred silicone resins can contain up to a total of 5 percent by weight of Si-bonded methoxy, ethoxy or hydroxyl groups. Generally, the silicone resins are not completely miscible with polydimethylsiloxanes.

Although it is not preferred, the antifoam compositions of this invention can contain up to about 10 percent by weight and preferably up to about 5 percent by weight, and more preferably not more than 1 percent by weight of 2,2,4-trimethyl-1,3-diisobutyryloxypentane, based on the sum of the weights of the essentially linear organopolysiloxane, silicone resin and filler(s). It is preferred that the antifoam compositions be free of the 2,2,4-trimethyl-1,3-diisobutyryloxypentane.

Although it is not preferred, the antifoam compositions of this invention may also contain surfactants. The amount of surfactants is preferably from 0 to 50 percent by weight, based on the total weight of the essentially linear organopolysiloxanes, silicone resins, filler(s) and dispersing agents present in the particular antifoam agent. The percentages by weight of essentially linear organopolysiloxane, silicone resin, filler(s) and dispersing agent present in the composition must, of course, make up to 100 percent by weight.

Examples of preferred surfactants are addition products of ethylene oxide of linear or branched alkanols or arylphenols containing 8 to 20 carbon atoms per molecule, such as isotridecylpolyoxyethylene glycol ether, stearylpolyoxyethylene glycol ether, cetylpolyoxyethylene glycol ether, trimethylnonylpolyoxyethylene glycol ether and nonylphenolpolyoxyethylene glycol ether, as well as addition products of ethylene oxide on linear or branched monocarboxylic acids and polymers. Such addition products preferably contain 2 to 15 ethylene oxide units per molecule. Examples of preferred surfactants are, in particular, polyoxyethylene glycol sorbitan esters and polyoxyethylene glycol sorbitol esters having HLB values of from 8 to 14, such as polyoxyethylene glycol sorbitan hexaoleate or polyoxyethylene sorbitol hexaoleate. (See U.S. Pat. No. 4,076,648 to Rosen, column 4, line 51 to column 6, line 2). Examples of preferred surfactants are fatty acid mono-, di- and polyglycerides and sodium stearoyllactate or calcium stearoyllactate, diglycerol stearic acid esters and sorbitan monostearate, polyvinyl alcohols, partly saponified polyvinyl acetates, starch and modified types of cellulose and polyacrylates.

The antifoam compositions of this invention can contain one type of surfactant or they may contain mixtures of at least two different types of surfactants.

The fillers in the antifoam compositions of this invention can be the same fillers which have been included, or could have been included, in antifoam compositions known heretofore which contain fillers. Examples of such fillers are hydrophilic and hydrophobic oxides of silicon, magnesium or zinc, in which these oxides preferably have a surface area of at least 50 $m^2/g$, salts of elements of groups II or III of the periodic table according to Mendeleev having an atomic number of from 12 to 30 with aliphatic monobasic carboxylic acids or hydroxycarboxylic acids containing from 12 to 22 carbon atoms per molecule, such as calcium stearate or calcium -12-hydroxystearate, and products that are solid at least at the particular temperature at which the antifoam compositions are used and have been prepared by reacting at least one monoor polyvalent isocyanate with at least one organic compound which contains at least one hydrogen atom which is reactive towards the isocyanate group, such as the product obtained from the reaction of naphthylene diisocyanate with cyclohexylamine. The preparation of the latter type of fillers is preferably carried out in the presence of at least one of the organopolysiloxanes used for the preparation of the antifoam compositions of this invention. Additional examples of fillers which may be used in the antifoam compositions of this invention are lithium stearate, magnesium silicate and magnesium aluminum silicate. Pyrogenically produced or precipitated silicon dioxide, in particular hydrophobic silicon dioxide having a surface area of at least 50 $m^2/g$ is especially preferred.

The antifoam compositions of this invention can contain one type of filler or they may contain mixtures of at least two different types of filler.

The amount of filler is preferably from 1 to 20, and more preferably from 2 to 8 percent by weight, based on the total weight of all the organopolysiloxanes and filler(s) present in the antifoam composition. The essentially linear organopolysiloxane having SiOC-bonded radicals, the silicone resin, also called MQ resin containing essentially triorganosiloxy and $SiO_{4/2}$ units, and any additional organopolysiloxanes which are present are to be included as organopolysiloxanes in the particular antifoam composition.

The additional organopolysiloxanes are, in particular, polydiorganosiloxanes which carry terminal hydroxyl and/or triorganosiloxy groups, in which at least 80 percent of the organo radicals are preferably methyl groups. These polydiorganosiloxanes preferably have a viscosity of from 35 to 5,000 mm$^2$/s$^{-1}$ at 25° C., and more preferably from 50 to 1,000 mm$^2$/s$^{-1}$ at 25° C. They are used, for example, to adjust the viscosity of the antifoam compositions of this invention to a desired degree.

The viscosity of the antifoam compositions of this invention which are contemplated for commercial use ranges from about 1,000 to 500,000, and more preferably from 25,000 to 40,000 mm$^2$/s$^{-1}$, measured at 25° C. The antifoam compositions of this invention can also contain condensation catalysts in addition to the ingredients mentioned above, such as LiOH, NaOH, KOH, RbOH or ScOH, in which KOH is the preferred catalyst. Condensation catalyst(s) are preferably used in the antifoam composition of this invention in amounts of from 0 to 1 percent, based on the weight of all of the components of the antifoam composition.

The weight ratio of essentially linear organopolysiloxanes having SiOC-bonded radicals (hereinafter referred to as the organopolysiloxanes) to silicone resins containing essentially triorganosiloxy and SiO$_{4/2}$ units (MQ resins) in the antifoam compositions of this invention may range from 1:10 to 10:1, preferably from 1:5 to 5:1 and more preferably from 1:2 to 2:1 parts by weight.

The antifoam compositions of this invention can be prepared by mixing the components in any desired sequence. Preferably, the MQ resin is first dissolved in a relatively low-boiling solvent, this solution is then combined with the organopolysiloxane having SiOC-bonded radicals to form a mixture and then the solvent is removed from the mixture by distillation; then, if appropriate, the organopolysiloxane which is generally used to adjust the viscosity of the antifoam composition and finally fillers and, if appropriate other additional substances are then added.

If the antifoam compositions of this invention are to be used as a constituent of detergents, they preferably contain no emulsifiers or dispersing agents. Detergents generally contain sufficient quantities of these substances. Furthermore, addition of these substances would accelerate the dispersion of the antifoam composition in the washing liquor, which would lead to a depletion of the antifoam composition at the washing liquor/air interface and thus reduce the effect of the antifoam composition.

In addition to the organopolysiloxanes and filler, the antifoam compositions of this invention can contain additional substances which have been or could have been used in the preparation of antifoam compositions based on organopolysiloxanes having a foam suppressant action and filler. Examples of such additional substances are mineral oils, paraffin waxes, vegetable oils, higher alcohols, glycols and ethylene oxide-propylene oxide polymers. The antifoam agents according to the invention can also be adsorbed onto solids or absorbed into solids, which enables them to be formulated as powders. Examples of such solids are plastics, such as polyvinyl acetates, polyvinyl alcohols, starch, polyacrylates, zeolites, inorganic salts, such as phosphates, for example, sodium tripolyphosphate and trisodium phosphate, and sulphates, such as sodium sulphate, or a mixture of at least two of the substances mentioned above and other similar substances.

They can also be spray-dried as such or as a mixture with suitable additives, such as pentanediol diisobutyrate, or in dispersed form with thickening agents, for example, cellulose derivatives such as methylcellulose, carboxymethylcelluloses, starch or polyvinyl alcohols and polymer dispersions, such as, for example, polyvinyl acetate. A corresponding spray-dried powder, for example, preferably contains the following ingredients:
- 40–70 percent by weight of polyvinyl acetate, stabilized with protective colloids,
- 5–70 percent by weight of polyvinyl alcohols or other thickening agents
- 3–40 percent by weight of the antifoam agents of this invention in bulk or in dissolved or emulsified form, and
- 3–25 percent by weight of an anticaking agent.

Examples of anticaking agents are finely ground aluminum silicates, kieselguhr, calcium carbonate, precipitated silicic acid and other similar materials.

The antifoam compositions of this invention can also be prepared as emulsions using the emulsifiers mentioned above and water.

The antifoam compositions of this invention can be used for preventing or reducing foam formation, not only but in particular on or in aqueous solutions, especially as additives to detergents or one or more constituents of detergents, such as sodium tripolyphosphate or sodium perborate or a mixture of such sodium compounds, and furthermore for example, in the evaporation of alkaline waste liquors of the paper industry, in the concentration of rubber latexes, in cutting oil emulsions in the metal working industry, in emulsion paints and other uses where synthetic resin dispersions are employed, in water lacquers, in lubricants, in crude oil production, textile dyeing, including the high temperature process and jet dyeing, effluent treatment, fermentation processes, such as in the preparation of antibiotics and ore flotation.

In the following examples, the activity of the antifoam compositions is in each case represented by a number. This number is called the "FRA" value (FRA=abbreviation for "foam resistance area") and is determined as follows:

The amount of the antifoam composition to be investigated stated with the appropriate FRA value in the following connection is added to 200 ml of a 4 percent strength by weight aqueous solution of sodium C$_{14-15}$-alkylsulphonate in an 800 ml glass beaker having a diameter of 9.5 cm and a height of 13 cm. The resultant mixture is foamed by 2 stirrers which run in opposite directions and have several arms each with an unbroken surface at 1,000 revolutions per minute for 1 minute so that no homogeneous liquid remains. Four light barriers are positioned vertically along the outer wall of the glass beaker each at a distance of 1.5 cm from one another. Such a device is shown in German Patent Application DE-OS 25 51 260 (laid open on May 18, 1977, Wacker-Chemie GmbH). When the foam collapses, the light barriers are released one after the other and a recorder automatically plots a graph showing on the abscissa the times (1 cm = 10 seconds) which elapse until the foam disappears at the top, second from the top, third from the top and the bottom light barrier. Eight cm on the ordinate corresponds to the top light barrier. A line is obtained which runs almost vertically from the point of the intersection of the abscissa and ordinate for 8 cm, then horizontally to the time of release of the second highest light barrier, drops vertically at this point in time and so on. Such a graph is also shown in DE-OS 25 51 260. The area which the staircase line thus obtained forms with the abscissa and ordinate is measured and gives the FRA value. The smaller the value, the greater the activity of the antifoam agent.

In the following examples, all parts and percentages are by weight, unless otherwise specified.

EXAMPLES

(A) Preparation of the SiOC organopolysiloxanes

About 650 g of an alpha-omega-bis-hydroxypolydimethylsiloxane having a viscosity of 80 mm$^2$.s$^{-1}$ at 25° C. were mixed with 220 g of 2-octyldodecanol and 4.5 g of 20 percent by weight methanolic KOH solution and then heated to 140° C, while the water formed as a result of the condensation was distilled off continuously. After cooling, the mixture was neutralized with dimethyldichlorosilane and then 18 g of sodium hydrogencarbonate were added and the mixture was dried over sodium sulphate and finally filtered. The oil thus obtained had a viscosity of about 180 mm$^2$.s$^{-1}$ at 25° C. NMR measurements showed that 23.5 percent by weight of decyl groups were present in the oil.

(B) Foam suppressant base

One part by weight of the oil prepared according to Example (A) above was mixed with 2 parts by weight of a 50 percent strength by weight solution of MQ resin in toluene, in which the MQ resin consisted of 40 mol percent of trimethylsiloxy units and 60 mol percent of SiO$_{4/2}$ units. Volatile constituents were distilled off from this mixture at 120° C. and under a pressure of 100 to 1.6 kPa (absolute). An oil having a viscosity of 3,200 mm$^2$.s$^{-1}$ at 25° C. was obtained. According to $^{29}$Si-NMR measurements, the oil contained 23.9 mol percent of trimethylsiloxy and 37 mol percent of SiO$_{4/2}$ units.

EXAMPLE 1

A mixture containing 89.3 parts by weight of an alpha-omega-bis-trimethylsilylpolyiimethylsiloxane having a viscosity of 5,000 mm$^2$.s$^{-1}$ at 25° C., 5 parts by weight of a foam suppressant base prepared according to Example (B), 5 parts by weight of a pyrogenically prepared highly dispersed silicic acid having a BET surface area of about 300 m2/g and 0.7 parts by weight of a 20 percent strength by weight of methanolic KOH solution was kept at 150° C. for 2 hours, and after cooling, was homogenized. An antifoam composition having a viscosity of about 25,600 mm$^2$.s$^{-1}$ at 25° C. was obtained.

EXAMPLE 2

A mixture containing 94 parts by weight of the foam suppressant prepared according to Example (B), 3 parts by weight of a precipitated silicic acid having a BET surface area of about 100 m$^2$/g and 3 parts by weight of a pyrogenically prepared silicic acid having a BET surface area of about 50 m$^2$/g was kept at 150° C. for 2 hours, and after cooling, was homogenized.

An antifoam composition having a viscosity of 10,350 mm$^2$.s$^{-1}$ at 25° C. was obtained

EXAMPLE 3

The procedure of Example 1 was repeated, except that 89.3 parts by weight of an alpha-omega-bis-hydropolydimethylsiloxane having a viscosity of 6000 mm$^2$/s at 25° C. was substituted for the alpha-omega-bis-trimethylsilylpolydimethylsiloxane. The resultant composition having a viscosity of about 400,000 mm$^2$.s$^{-1}$ was reduced to a viscosity of about 30,000 mm$^2$/s at 25° C. with a methylsilicone oil having a viscosity of about 50 mm$^2$/s at 25° C. (commercially obtainable from Wacker-Chemie GmbH as silicone oil AK 50).

EXAMPLE 4

A mixture containing 90 parts by weight of an alphaomega-bis-trimethylsilylpoydimethylsiloxane having a viscosity of about 350 mm$^2$/s at 25° C., 5 parts by weight of a pyrogenically prepared silicic acid having a BET surface area of about 300 m$^2$/g and 5 parts by weight of the foam suppressant base prepared according to Example (B) was kept at 150° C. for 2 hours, and after cooling, was homogenized. An antifoam composition having a viscosity of 11,300 mm$^2$/s at 25° C. was obtained.

COMPARISON EXAMPLES 1 to 4

A mixture containing 95 parts by weight of an alpha-omega-bis-trimethylsilylpolydimethylsiloxan having a viscosity of 350 mm$^2$/s (Comparison Example 1) or 5,000 mm$^2$/s (Comparison Examples 2 and 4) or 10,000 mm$^2$/s (Comparison Example 3) and 5 parts by weight of a pyrogenically prepared silicic acid with a BET surface area of 200 m$^2$/g, and in Comparison Example 4, 0.1 parts by weight of a 20 percent strength by weight methanolic KOH solution, was kept at 180° C for 3 hours, and after cooling, homogenized.

ACTION EXAMPLES

The FRA values were in each case determined by the procedure described above for the examples and comparison examples, in which 0.1 g of the antifoam composition was used in each case as a 10 percent strength by weight solution in ethyl acetate. These FRA values are shown in the following table. In this table, FRA (1) is the FRA value determined as stated above, FRA (2) is the values obtained in repeating the test and FRA (3) is the values determined in repeating the test a second time without further addition of antifoam composition.

TABLE

|  | FRA (1) | FRA (2) | FRA (3) |
|---|---|---|---|
| Example | | | |
| 1 | 250 | 220 | 300 |
| 2 | 450 | 560 | 820 |
| 3 | 180 | 200 | 240 |
| 4 | 485 | 510 | 590 |
| Comparison Example | | | |
| 1 | 950 | 1,610 | 2,580 |
| 2 | 800 | 1,450 | 2,160 |
| 3 | 750 | 1,300 | 2,050 |
| 4 | 700 | 1,250 | 1,920 |

The foam suppressant action is greater the smaller the FRA value of the particular composition.

EXAMPLE 5

About 4,000 g of a 55 percent strength polyvinyl acetate dispersion stabilized with a protective colloid, 2,200 g of a 20 percent strength solution of polyvinyl alcohol having a saponification number of 140 and a viscosity of 5 mPa.s at 20° C., measured in a 4 percent strength aqueous solution, and 656 g of an antifoam composition prepared in accordance with Example (1), were dispersed in 3,000 g of water in a high-speed stirrer (dissolver).

The resultant dispersion was spray-dried in a spray-dryer having a discharge temperature of 80° C. and the resultant powder (3,300 g) was mixed with 330 g of an anticaking agent (aluminum silicate).

The FRA value of a suspension of 0.075 g of the antifoam composition prepared in this manner in 200 ml of a 4 percent strength by weight aqueous solution of alkyl sulphonate were:

FRA(1): 1410; FRA(2): 1480; FRA(3): 1540.

Comparison Example 5

The procedure of Example 5 was repeated, except that the same amount of the antifoam composition prepared according to Comparison Example 2 was substituted for the antifoam composition of Example 1.

The FRA values determined in accordance with Comparison Example 5 were:

FRA(1): 2020; FRA(2): 2510; FRA(3): 2950.

What is claimed is:

1. An antifoam composition containing (a) an essentially linear organopolysiloxane, (b) a silicone resin, consisting essentially of traiorganosiloxy and SiO$_{4/2}$ units, and (c) a filler, in which at least part of the essentially linear organopolysiloxane contains SiC-bonded monovalent hydrocarbon radicals, and SiOC-bonded organic radicals selected from the group consisting of radicals containing carbon and hydrogen atoms, radicals containing carbon, hydrogen and at least 2 oxygen atoms per radical and radicals containing carbon, hydrogen and at least 2 oxygen atoms and at least one Si atom, in which the SiOC-bonded organic radicals have at least 6 carbon atoms per radical and (d) up to 10 percent by weight of 2,2,4-trimethyl-1,3diisobutyryloxypentane, based on the weight of the essentially linear organopolysiloxane, the silicone resin and filler.

2. The antifoam composition of claim 1, wherein the composition is free of 2,2,4-trimethyl-1,3-diisobutyryloxypentane.

3. The antifoam composition of claim 1, wherein the SiOC bonded radicals contain carbon and hydrogen atoms.

4. The antifoam composition of claim 1, wherein the SiOC-bonded radicals contain carbon, hydrogen and at least 2 oxygen atoms per radical.

5. The antifoam composition of claim 1, wherein the silicone resin (b) consists of at least 90 percent of units of the formula

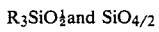

$R_3SiO_{1/2}$ and $SiO_{4/2}$ where R is selected from the group consisting of monovalent hydrocarbon radicals and substituted monovalent hydrocarbon radicals having from 1 to 18 carbon atoms.

6. The antifoam composition of claim 1, wherein the filler (c) is present in an amount of from 2 to 8 weight percent based on the total weight of the organopolysiloxane, silicone resin and filler.

7. A powdered antifoam composition which is obtained by mixing (a) an essentially linear organopolysiloxane with (b) a silicone resin consisting essentially of triorganosiloxy and SiO$_{4/2}$ units, and (c) a filler, in which at least part of the essentially linear organopolysiloxane contains SiC-bonded monovalent hydrocarbon radicals, and SiOC-bonded organic radicals selected from the group consisting of radicals containing carbon and hydrogen atoms, radicals containing carbon, hydrogen and at least 2 oxygen atoms per radical and radicals containing carbon, hydrogen and at least 2 oxygen atoms and at least one Si atom, in which the SiOC-bonded organic radicals have at least 6 carbon atoms per radical and (d) up to 10 percent by weight of 2,2,4-trimethyl-1,3-diisobutyryloxypentane, based on the weight of the essentially linear organopolysiloxane, the silicone resin and filler to form a mixture and thereafter the mixture is spray-dried to form a powder.

* * * * *